(12) United States Patent
Wu et al.

(10) Patent No.: US 11,735,065 B1
(45) Date of Patent: Aug. 22, 2023

(54) METHOD FOR BUILDING VEHICLE CRASH DUMMY SKULL MODEL

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Wu, Tianjin (CN); Zhixin Liu, Tianjin (CN); Hengxu Lv, Tianjin (CN); Weidong Liu, Tianjin (CN); Zhengqi Fan, Tianjin (CN); Yongqiang Wu, Tianjin (CN); Hai Liu, Tianjin (CN); Kai Wang, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/190,117

(22) Filed: Mar. 26, 2023

(30) Foreign Application Priority Data

Aug. 17, 2022 (CN) .......................... 202210983665.3

(51) Int. Cl.
*G06T 17/20* (2006.01)
*G09B 23/30* (2006.01)

(52) U.S. Cl.
CPC .............. *G09B 23/30* (2013.01); *G06T 17/20* (2013.01)

(58) Field of Classification Search
CPC ........ G06T 17/00; G06T 17/20; G06T 17/205
See application file for complete search history.

(56) References Cited

U.S. PATENT DOCUMENTS

| 5,256,070 A | 10/1993 | Garth et al. |
| 10,733,911 B2 | 8/2020 | Beebe et al. |

(Continued)

FOREIGN PATENT DOCUMENTS

| CN | 101339670 A | 1/2009 |
| CN | 103679816 A | 3/2014 |

(Continued)

OTHER PUBLICATIONS

Xu, Bin, Zhongke Li, and Ying Tan. "Feature based hole filling algorithm on triangular mesh." Computer and Computing Technologies in Agriculture VII: 7th IFIP WG 5.14 International Conference, CCTA2013, Beijing, China, Sep. 18-20, 2013. (Year: 2013).*

*Primary Examiner* — Ryan McCulley
(74) *Attorney, Agent, or Firm* — True Shepherd LLC; Andrew C. Cheng

(57) ABSTRACT

A method for building a vehicle crash dummy skull model, includes: building an original skull model according to computed tomography scan data of a human skull; inserting a new first node according to a distance between adjacent first nodes on a hole boundary contour line, to obtain a target contour line; inserting a plurality of second nodes into holes according to the target contour line to obtain an intermediate boundary contour line; forming triangular nets according to the nodes on the target contour line and the intermediate boundary contour line; and with the intermediate boundary contour line as a new target contour line, returning to the operation of inserting a plurality of second nodes until the number of nodes of a final target contour line is less than or equal to a preset value. This embodiment is conducive to building of a skull model with a smooth cranial surface.

8 Claims, 15 Drawing Sheets

(56) References Cited

U.S. PATENT DOCUMENTS

| | | | |
|---|---|---|---|
| 2006/0094951 A1 | 5/2006 | Dean et al. | |
| 2008/0218509 A1* | 9/2008 | Voth | G06T 17/20 345/419 |
| 2019/0378332 A1* | 12/2019 | Sun | G06T 17/20 |
| 2022/0391548 A1* | 12/2022 | Boettner | G06F 30/10 |

FOREIGN PATENT DOCUMENTS

| | | | |
|---|---|---|---|
| CN | 106777473 A | 5/2017 | |
| CN | 106780591 A | 5/2017 | |
| CN | 107423773 A | 12/2017 | |
| CN | 110176066 A | 8/2019 | |
| CN | 112070898 A | 12/2020 | |
| CN | 112288645 A | 1/2021 | |
| WO | 2018103640 A1 | 6/2018 | |
| WO | 2022089056 A1 | 5/2022 | |

\* cited by examiner

METHOD FOR BUILDING VEHICLE CRASH DUMMY SKULL MODEL

CROSS-REFERENCE TO RELATED APPLICATIONS

This application claims priority to Chinese Patent Application No. 202210983665.3 with a filing date of Aug. 17, 2022. The content of the aforementioned application, including any intervening amendments thereto, is incorporated herein by reference.

Technical Field

Embodiments of the present invention relate to the field of simulation modeling, in particular to a method for building a vehicle crash dummy skull model.

Description of Related Art

Skull is the most important protective layer of human brain and the most important barrier of head against impact. Crash tests can simulate head injuries in different cases by using a crash dummy instead of a real person. Because a head injury value of the crash dummy is obtained by a sensor installed in its head, no excessive details of a face of a dummy skull model are required to be described. In addition, in order to facilitate installation and manufacture, the skull model has no holes and excessive protrusions and depressions, and its cranial surface is relatively smooth.

In the prior art, a complete and accurate skull model is constructed through spiral computed tomography (CT), nuclear magnetic resonance, etc., which serves as reference for dummy skull design. Through such means, expensive and complex devices and complex operations and computations are required, detailed features of the skull model obtained are excessive, and most protrusions and depressions remain on the cranial surface, which are not conducive to manufacture of a smooth cranial surface.

Summary of Present Invention

Embodiments of the present invention provide a method for building a vehicle crash dummy skull model, which improves modeling efficiency, reduces costs, is conducive to building of a skull model with a smooth cranial surface, and provides reference for cranial surface design of a crash dummy.

In a first aspect, an embodiment of the present invention provides a method for building a vehicle crash dummy skull model, including:
  building an original skull model according to computed tomography scan data of a human skull, and extracting a hole boundary contour line from the original skull model;
  inserting, according to a distance between adjacent first nodes on the hole boundary contour line, a new first node between adjacent first nodes, to obtain a target contour line;
  inserting a plurality of second nodes into holes according to the target contour line, and inserting a new second node between adjacent second nodes according to a distance between adjacent second nodes, to obtain an intermediate boundary contour line;
  forming triangular nets according to the nodes on the target contour line and the intermediate boundary contour line, and adjusting shapes of the nets according to position relationships between triangular adjacent nets; and
  with the intermediate boundary contour line as a new target contour line, returning to the operation of inserting a plurality of second nodes until the number of nodes of a final target contour line is less than or equal to a preset value.

In a second aspect, an embodiment of the present invention further provides an electronic device. The electronic device includes:
  one or more processors; and
  a memory, used for storing one or more programs, where when the one or more programs are executed by the one or more processors, the one or more processors are enabled to implement the method for building a vehicle crash dummy skull model according to any of the embodiments.

In a third aspect, an embodiment of the present invention further provides a computer-readable storage medium storing a computer program, where the program, when executed by a processor, implements the method for building a vehicle crash dummy skull model according to any of the embodiments.

In the embodiments of the present invention, the original skull model is built by using the CT scan data, which are not only simple, fast, and low-cost, but also have better bone imaging capability than nuclear magnetic data. Based on the original skull model, nodes are inserted into holes layer by layer from the hole boundary contour line, to build a network layer by layer, so as to satisfy morphological constraints between a boundary layer and a generated layer to a maximum extent. Meanwhile, before nodes of the next layer are inserted, new nodes are inserted according to an average distance of nodes in the current layer, so as to ensure that triangular nets of the current layer have desirable shapes; after the nodes of the next layer are inserted and triangular nets of the next layer are formed, the shapes of the nets are adjusted in time, so as to ensure that the triangular nets of the next layer have desirable shapes; and the foregoing two aspects avoid diffusion effects of long and narrow boundaries or unqualified nets in a whole hole repair process, thereby ensuring that a skull model has a desirable geometric shape. Moreover, this embodiment is performed under layer constraints, is applicable to both holes with large distortion or relatively gentle holes, and therefore, has high robustness.

BRIEF DESCRIPTION OF THE DRAWINGS

In order to describe technical solutions in specific embodiments of the present invention or in the prior art more clearly, the following briefly introduces the accompanying drawings required in the description of the specific embodiments or the prior art. Apparently, the accompanying drawings in the following description show only some embodiments of the present invention, and those of ordinary skill in the art can still derive other drawings from these drawings without any creative effort.

FIG. 13(a) is a triangulation mode, and FIG. 13(b) is another triangulation mode.

FIG. 14(a) is a triangulation mode, and FIG. 14(b) is another triangulation mode.

DESCRIPTION OF THE EMBODIMENTS

In order to make objectives, technical solutions and advantages of the present invention clearer, technical solutions of the present invention will be described clearly and completely below. Obviously, the described embodiments are only some rather than all embodiments of the present invention. Based on the embodiments of the present invention, all other embodiments obtained by those of ordinary skill in the art without any creative effort fall within the protection scope of the present invention.

In the description of the present invention, it should be noted that the orientation or position relationships indicated by the terms "center", "upper", "lower", "left", "right", "vertical" "horizontal", "inner", "outer", etc. are based on the orientation or position relationships shown in the accompanying drawings and are intended to facilitate the description of the present invention and simplify the description only, rather than indicating or implying that the device or element referred to must have a particular orientation or be constructed and operated in a particular orientation, and will not to be interpreted as limiting the present invention. Furthermore, the terms "first", "second" and "third" are only for the sake of description, and cannot be understood as indicating or implying the relative importance.

In the description of the present invention, it should also be noted that, unless otherwise specified and defined, the terms "installed", "coupled" and "connected" should be generally understood, for example, the "connected" may be fixedly connected, detachably connected, integrally connected, mechanically connected, electrically connected, directly connected, or connected by a medium, or internal communication between two elements. For those of ordinary skill in the art, the specific meanings of the terms described above in the present invention can be construed according to specific circumstances.

Figure 1:
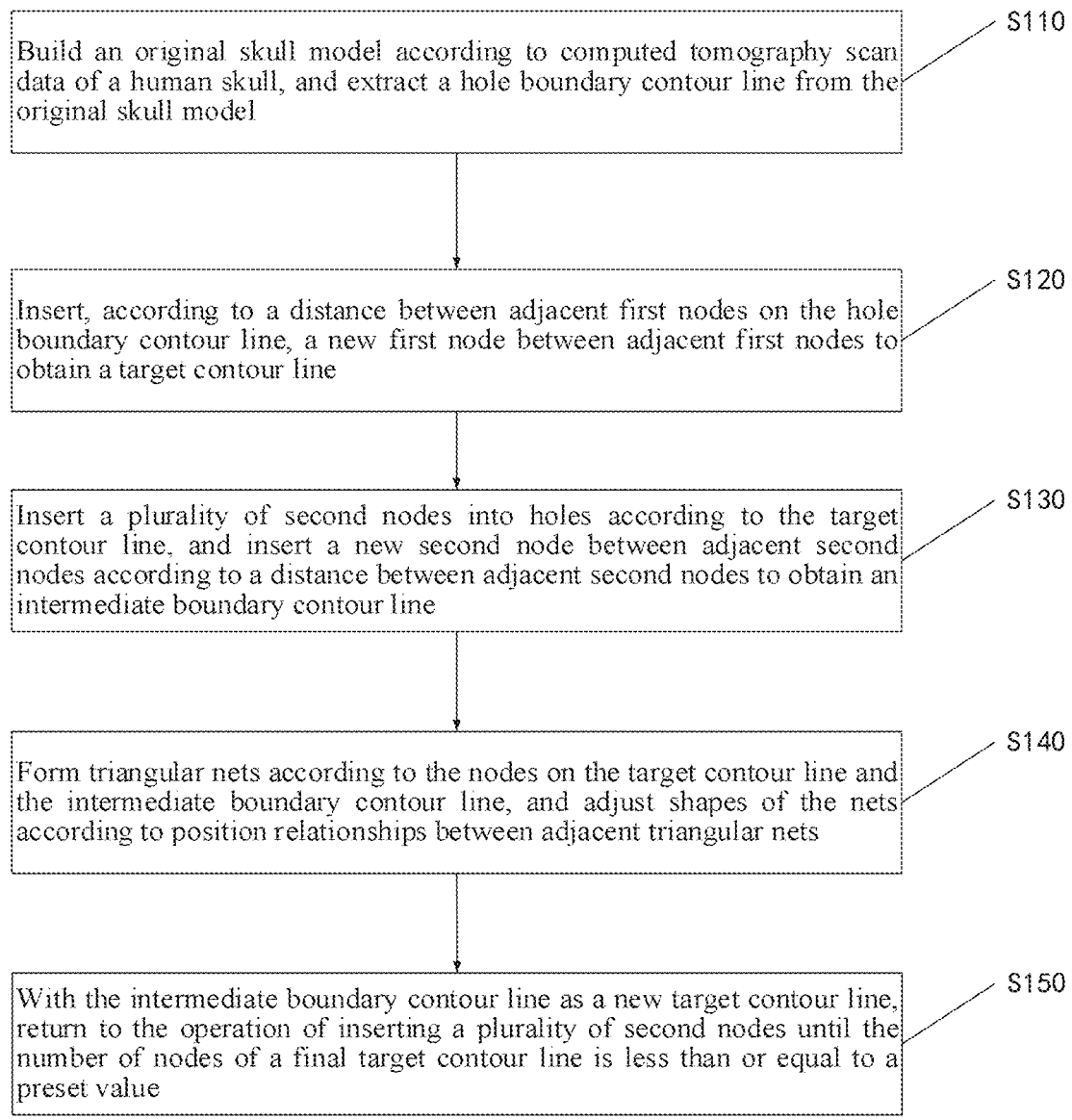
FIG. 1 is a flowchart of a method for building a vehicle crash dummy skull model according to an embodiment of the present invention.

FIG. 1 is a flowchart of a method for building a vehicle crash dummy skull model according to an embodiment of the present invention. This method is suitable for building a smooth skull model according to computed tomography (CT) scan data of a human skull, and is executed by an electronic device. As shown in FIG. 1, the method specifically includes:

S110, an original skull model is built according to computed tomography scan data of a human skull, and a hole boundary contour line is extracted from the original skull model.

A CT technology uses X-rays to scan the human body. A received analog signal is converted into a digital signal by a detector, then an attenuation coefficient of each pixel is computed by a computer, an image is reconstructed, and a tomographic structure of each part of the human body may be displayed. This technology builds a model layer by layer in a form of tomographic images, and scanning accuracy varies according to a scanning thickness of each layer. The CT technology used for building the original skull model is not only simple, fast, and low-cost, but also has better bone imaging capability than nuclear magnetic resonance.

Figure 2:
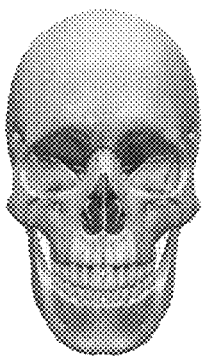
FIG. 2 is a schematic diagram of a front view of an original skull model according to an embodiment of the present invention.
Figure 3:
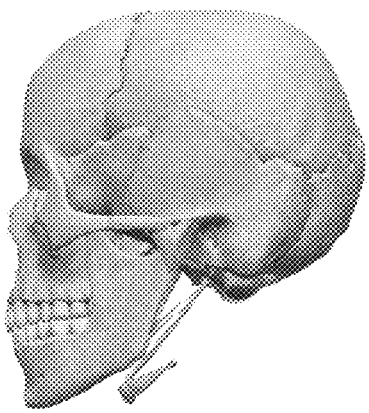
FIG. 3 is a schematic diagram of a side view of an original skull model according to an embodiment of the present invention.

In a specific implementation, scanned objects are 50 percent of male volunteers. After CT scan data of human skulls are obtained, an original skull model is first built according to the scan data, as shown in FIG. 2 and FIG. 3. Specifically, the CT scan data are stored in a digital imaging and communications in medicine (DICOM) format, and a CT scan file in the DICOM format is imported into Mimics software, to obtain the original skull model, the original skull model including a plurality of triangular nets. The Mimics software is a kind of medical image control software, and may build a corresponding finite element model through CT scan data. Then, the hole boundary contour line is extracted from the original skull model. It may be seen that holes to be repaired in the original skull model mainly include. left and right eye holes, nose holes, left and right ear holes, left and right jaw holes, occipital holes, and the like. In this step, a boundary contour line of each hole is extracted to limit a scope of subsequent hole repair. A specific extraction process will be described in detail in subsequent embodiments, which will not be repeated herein.

S120, according to a distance between adjacent first nodes on the hole boundary contour line, a new first node is inserted between adjacent first nodes, to obtain a target contour line.

Because of little data information in a skull defect area, the holes in the original skull model may cause long and narrow triangular nets. A length of a long and narrow boundary is not coordinated with lengths of other edges on a whole hole boundary, which may cause a bad effect on a shape of a triangular net added subsequently. In order to reduce this effect, new nodes are inserted into long and narrow boundaries in this step, so that distances between nodes are balanced as much as possible, lengths of edges formed by the nodes are coordinated, and occurrence of long and narrow triangular nets subsequently is avoided. For easy distinguishing and description, the nodes on the hole boundary contour line are referred to as "first nodes".

Specifically, first nodes on the hole boundary contour line are traversed, and an average distance between adjacent first nodes is computed; a ratio of the distance of each pair of adjacent first nodes to the average distance is computed; and if the ratio corresponding to adjacent first nodes is greater than a preset value, a new first node is inserted between the adjacent first nodes, and the target contour line is constructed by the first nodes on the hole boundary contour line and the new first nodes together; and alternatively, if the ratio corresponding to each pair of adjacent first nodes is less than or equal to the preset value, the target contour line is constructed by the first nodes on the hole boundary contour line. In this case, the target contour line is a final hole boundary contour line.

The preset value may be specifically set according to an actual requirement, for example, set to 1.5. In a specific implementation, all boundaries of current holes are traversed counterclockwise. If the length $d_{ij}=|p_i-p_j|$ of the current edge $E_{ij}$ satisfies $d_{ij}/l_\alpha>1.5$, where $p_i$ and $p_j$ represent two nodes of $E_{ij}$ respectively, $l_\alpha$ represents an average length of the hole boundaries (namely, an average distance between adjacent first nodes), then a new first node p is inserted at a midpoint of the edge $E_{ij}$, the midpoint is connected to the node p to form an original triangular net into two new triangular nets, and topological relationships between changed points and surfaces are updated at the same time. This process is repeated until all the boundaries of the current holes are processed. The $p_i$, $p_j$ and p construct a final hole boundary contour line together.

S130, a plurality of second nodes are inserted into holes according to the target contour line, and a new second node is inserted between adjacent second nodes according to a distance between adjacent second nodes, to obtain an intermediate boundary contour line.

After the target contour line is obtained, new nodes are generated in a hole area on the basis of the target contour line. For easy distinguishing and description, the nodes inserted into the hole area are referred to as "second nodes", which are used for completing triangulation of the hole area.

First, a plurality of second nodes are inserted into holes according to the target contour line. Optionally, nodes on the target contour line are traversed to determine a midpoint and a vertical direction of a line connecting adjacent nodes; and starting from each midpoint, a set distance is extended to an interior of a hole in the corresponding vertical direction to obtain each second node, where the set distance is an average distance between the adjacent nodes on the target contour line.

Figure 4:
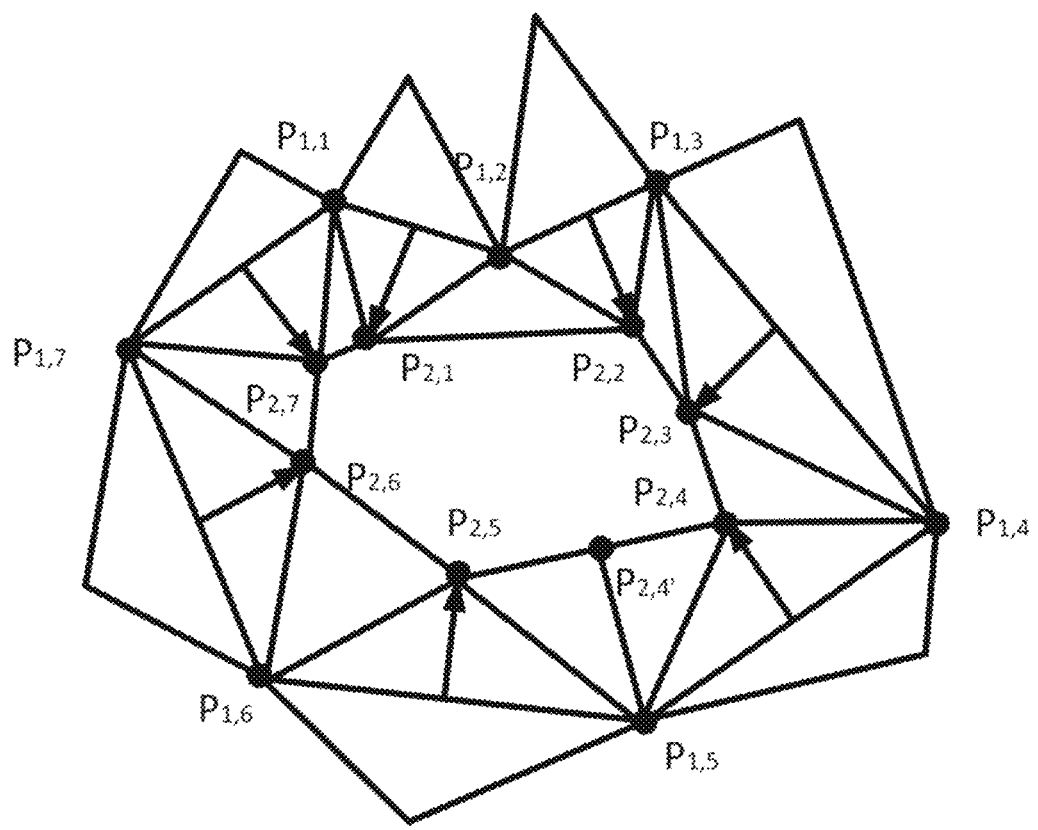
FIG. 4 is a schematic diagram of inserting nodes into a hole area and forming triangular nets according to an embodiment of the present invention.

In a specific implementation, the nodes on the target contour line are sequentially traversed counterclockwise, and sequentially added to a double circular linked list AList to form a boundary linked list of the $i^{th}$ layer (an initial value of i is 1), and the boundary linked list is installed into an adjacent linked list BList; and at the same time, information such as the number of nodes on the target contour line and the average distance $L_i$ between the nodes is recorded in the lists. From the first node to the last node in the list AList, the current node $p_{i,j}$ and its adjacent node $p_{i,j+1}$ ($p_{i,j}$ represents the $j^{th}$ node on the i layer) are searched in turn, and a new node $p_{i+1,\ j}$ is inserted into the boundary at a midpoint position of the two according to a specified extension direction and extension distance, and the new node is put into a double circular linked list CList. The extension direction is perpendicular to a vector formed by the nodes $p_{i,j}$ and $p_{i,\ j+1}$, and the average distance $L_i$ of the nodes on the i layer is set as the extension distance. With FIG. 4 as an example, assuming that $p_{1,1}$ to $p_{1,7}$ on the outermost layer construct a target contour line, a second node $p_{2,1}$ is inserted into a hole area at a midpoint position of the node $p_{1,1}$ and its adjacent node $p_{1,2}$.

Then, in order to further reduce a probability of generating a long and narrow triangular net, a new second node is inserted between adjacent second nodes according to a distance of adjacent second nodes, to obtain an intermediate boundary contour line. Optionally, the plurality of second nodes are traversed, and an average distance between adjacent second nodes is computed; a ratio of a distance of each pair of adjacent second nodes to the average distance is computed; and if the ratio corresponding to adjacent second nodes is greater than a preset value, a new second node is inserted between adjacent second nodes, and the intermediate boundary contour line is constructed by the plurality of second nodes and the new second nodes together; and alternatively, if the ratio corresponding to each pair of adjacent second nodes is less than or equal to the preset value, the intermediate boundary contour line is constructed by the plurality of second nodes.

The preset value here may also be set as needed, for example, 1.5. In a specific implementation, a distance between a second node and its adjacent node stored in the circular check list CList is d. If $d=\|P_{i+1,j}\ p_{i+1,j+1}\|>1.5\times L_{i+1}$, a new second node $p_{i+1,j'}$ is inserted at a midpoint of an edge $p_{(i+1),j}\ p_{(i+1),j+1}$ to form a long and narrow triangular net into two new triangular nets. Taking FIG. 4 as an example, a node $p_{2,4'}$ is inserted at a midpoint of an edge $p_{2,4}p_{2,5}$. In this way, all nodes are checked until a tail node of the current layer list AList, and the final CList may be used as an $(i+1)^{th}$ layer of an adjacency list.

S140, triangular nets are formed according to the nodes on the target contour line and the intermediate boundary contour line, and shapes of the nets are adjusted according to position relationships between adjacent triangular nets.

In this step, triangulation is completed between the target contour line and the intermediate boundary contour line, and the hole area is gradually filled by adding triangular nets. First, triangular nets are formed according to the nodes on the target contour line and the intermediate boundary contour line. Optionally, for any one of the plurality of second nodes, adjacent nodes, between which the second node is to be inserted, on the target contour line are determined, and the adjacent nodes are connected with the second node separately; for any new second node other than the plurality of second nodes, adjacent second nodes, between which the new second node is to be inserted, among the plurality of second nodes, and four nodes, between which adjacent second nodes are to be inserted, on the target contour line are determined, and the new second node is connected with repeated nodes of the four nodes; and the triangular nets are constructed by the connected edges, the target contour line, and the intermediate boundary contour line.

In a specific implementation, the target contour line is used as a $i^{th}$ layer of nodes, and the intermediate boundary contour line is used as an $(i+1)^{th}$ layer of nodes. By analyzing the foregoing steps of generating second nodes, each node on the $i^{th}$ layer is associated with two nodes on the $(i+1)^{th}$ layer, and each node on the $(i+1)^{th}$ layer is generated by two nodes on the $i^{th}$ layer. Therefore, node $p_{i+1,j}$ and nodes $p_{i,j}$ and $p_{i,j+1}$ generated therefrom are first sequentially connected, then all nodes on the $(i+1)^{th}$ layer are sequentially connected, and finally $p_{i+1,j}$ and $p_{i,j+1}$ are connected to complete a division of triangular nets. Taking FIG. 4 as an example, node $p_{2,4}$ and nodes $p_{1,4}$ and $p_{1,5}$ generated therefrom are connected, node $p_{2,5}$ and nodes $p_{1,5}$ and $p_{1,6}$ generated therefrom are connected, $p_{2,4}$ and $p_{2,5}$ are connected, and then $p_{2,4'}$ and $p_{1,5}$ are connected. At the same time, the new nodes and a topological relationship between the triangular nets are saved to a relevant data structure.

After the triangular nets are obtained by connecting nodes, shapes of the nets are further adjusted according to position relationships between adjacent triangular nets. Optionally, if the nodes of the adjacent triangular nets are concyclic, the node connection relationship between the adjacent triangular nets is adjusted through a minimum weight method; and alternatively, if the nodes of the adjacent triangular nets are non-concyclic, the node connection relationship between the adjacent triangular nets is adjusted through a minimum internal angle maximization method.

Specifically, the minimum internal angle maximization method and the minimum weight method have their own advantages. The minimum weight method is faster, and the minimum internal angle maximization method is better in triangular shape. However, when four nodes of a quadrilateral are concyclic (minimum internal angles of two pairs of triangles in the quadrilateral are equal), the minimum internal angle maximization method cannot be used, and when diagonals of the quadrilateral are equal, the minimum weight method cannot be used. Based on this, in this step, the minimum internal angle maximization method is used in a non-concyclic case for triangulation; and the minimum weight method is used in a concyclic case for triangulation to redistribute an initial triangular network, so that triangular shapes in new nets obtained are better, a volume of data is smaller, and computation efficiency can be improved.

S150, with the intermediate boundary contour line as a new target contour line, the operation of inserting a plurality of second nodes until the number of nodes of a final target contour line is less than or equal to a preset value is returned to.

Based on the $(i+1)^{th}$ layer of nodes, S130 is returned for an iterative loop. Each loop generates a layer of triangular nets until the number of nodes of the final target contour line reaches a set value. When the set value is equal to 3, three nodes are directly connected to generate a triangular net, and the whole loop ends.

In this embodiment, the original skull model is built by using CT scan data, which is not only simple, fast, low-cost, but also is better than nuclear magnetic data in bone imaging capability. Starting from the hole boundary contour line, nodes are inserted into holes layer by layer to construct a network layer by layer, so as to satisfy morphological constraints between a boundary layer and a generated layer to a maximum extent. Meanwhile, before nodes of the next layer are inserted, new nodes are inserted according to an average distance of nodes in the current layer, to ensure that triangular nets of the current layer have desirable shapes; after the nodes of the next layer are inserted and triangular nets of the next layer are formed, the node connection relationship of the triangular nets is adjusted through the minimum weight method and the minimum internal angle maximization method, to ensure that the triangular nets of the next layer have desirable shapes; and the foregoing two aspects avoid diffusion effects of long and narrow boundaries or unqualified nets in a whole hole repair process, thereby ensuring that a skull model has a desirable geometric shape. Moreover, this embodiment is performed under layer constraints, is applicable to both holes with large distortion or relatively gentle holes, and therefore, has high robustness.

Based on the foregoing embodiments and the following embodiments, this embodiment refines a process of building an original skull model. Optionally, the building an original skull model according to CT scan data of a human skull includes the following steps:

Step 1, after a human body is scanned, CT scan data are selected within a set range, to generate the original skull model. Specifically, an overall value range of the CT scan data is −1024 to +3072, and different tissues correspond to different CT values, for example, −1000 for air, 0 for water, about −100 for fat in human tissues, about 40 for a muscle, 100 to 300 for a cancellous bone, about 2000 for a dense bone, and more than 2000 for an enamel. In this embodiment, CT scan data in [226, 1938] may be selected to generate the original skull model.

Step 2, the original skull model is repaired. A repair method is pixel filling or deletion for each layer of section. First, an area above orbits in the CT scan data is repaired, where frontal sinus is a key part of this area. The pixel filling is based on an anatomical map in an anatomical atlas and a blurred boundary in the CT scan data. Meanwhile, in order to ensure full combination with facial bones, pixels below the orbits are deleted, and a repaired CT image (namely, CT scan data) and a three-dimensional model are obtained. Then, the facial bones and an area below the facial bones, including the skull base, are repaired. The repair on the face focuses on structures around the orbits, nasal bones, both sides of the nasal cavity, and a posterior upper part of the nasal cavity. In the skull base area, the repair is to ensure accuracy of fossae and eminences in the skull base, as well as the foramen magnum and other small foramens. These structures affect transmission of internal pressure in the skull, and only when the skull base is accurate enough, the skull base can be combined with the cervical spine to carry out related cervical test simulation and skull base fracture simulation. Finally, it is relatively simple to repair the mandible, and the key point is to ensure an accurate shape of a joint between the mandible and the skull. The repair in this step is mainly structural repair, so that the model satisfies requirements in structure.

Figure 5:
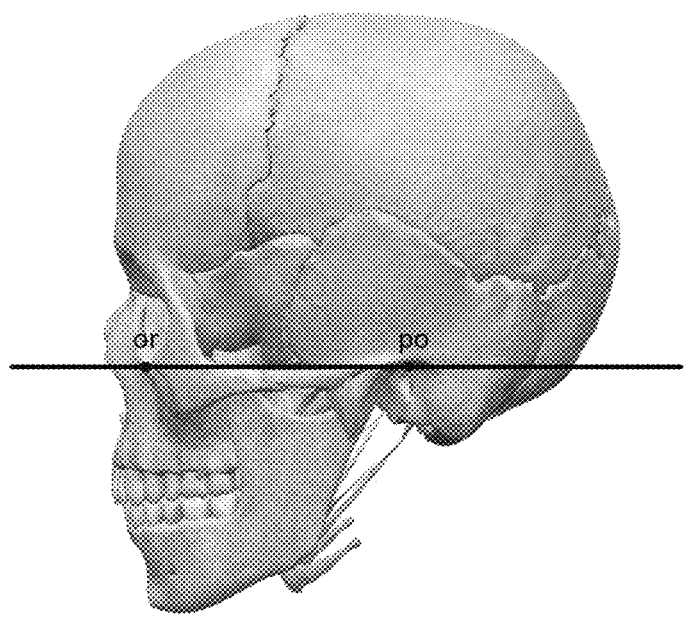
FIG. 5 is a schematic diagram of a Frankfurt plane according to an embodiment of the present invention.

Step 3, a Frankfurt plane of the skull is determined according to the repaired original skull model. The Frankfurt plane is, as shown in FIG. 5, a horizontal plane where left and right supra-auricular points (po) and a left infraorbital point (OR) are located, so the Frankfurt plane is referred to as an ear-eye plane. Optionally, the supra-auricular points and the infraorbital point input by a modeler are obtained by human-computer interaction, and then the Frankfurt plane of the skull is determined.

Figure 6:
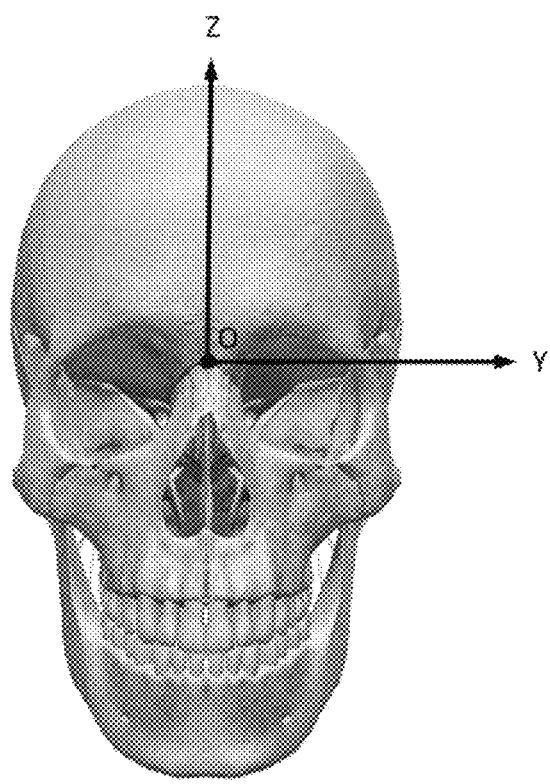
FIG. 6 shows a YOZ coordinate system of a skull coordinate system according to an embodiment of the present invention.
Figure 7:
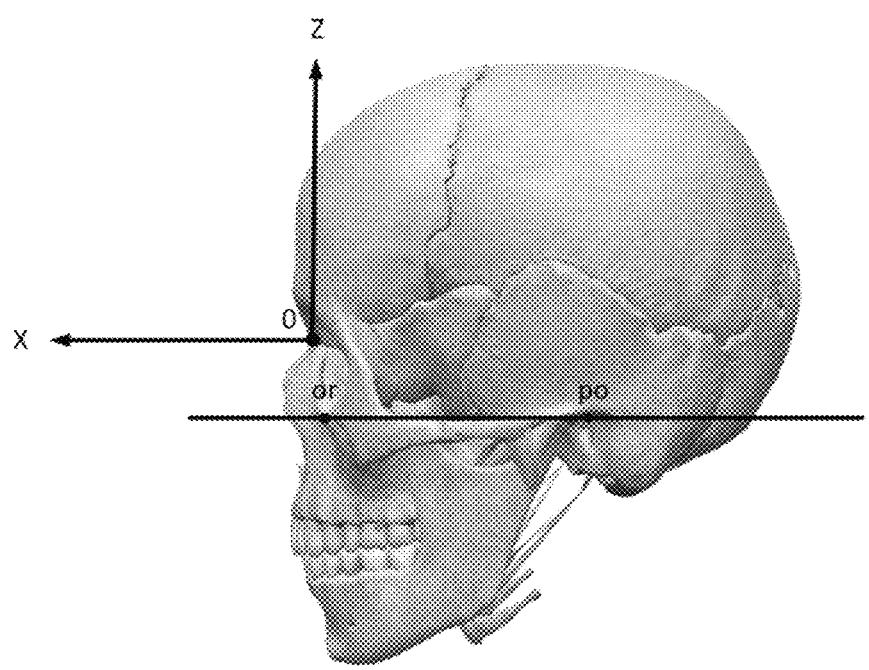
FIG. 7 shows an XOZ coordinate system of a skull coordinate system according to an embodiment of the present invention.

Step 4, a skull coordinate system is built according to the Frankfurt plane. With the nasion as an origin, an x axis is built perpendicular to a coronal plane across the origin and parallel to the Frankfurt plane, in a direction from back to front; a y axis is built perpendicular to a midsagittal plane across the origin and parallel to the Frankfurt plane, in a direction from right to left; a z axis is built perpendicular to the Frankfurt plane across the origin, in a direction from bottom to top; and accordingly, the skull coordinate system is built, as shown in FIG. 6. Optionally, the skull coordinate system is built through human-computer interaction. Here, "front", "back", "left", and "right" are all relative to the front orientation of the skull model.

Figure 8:
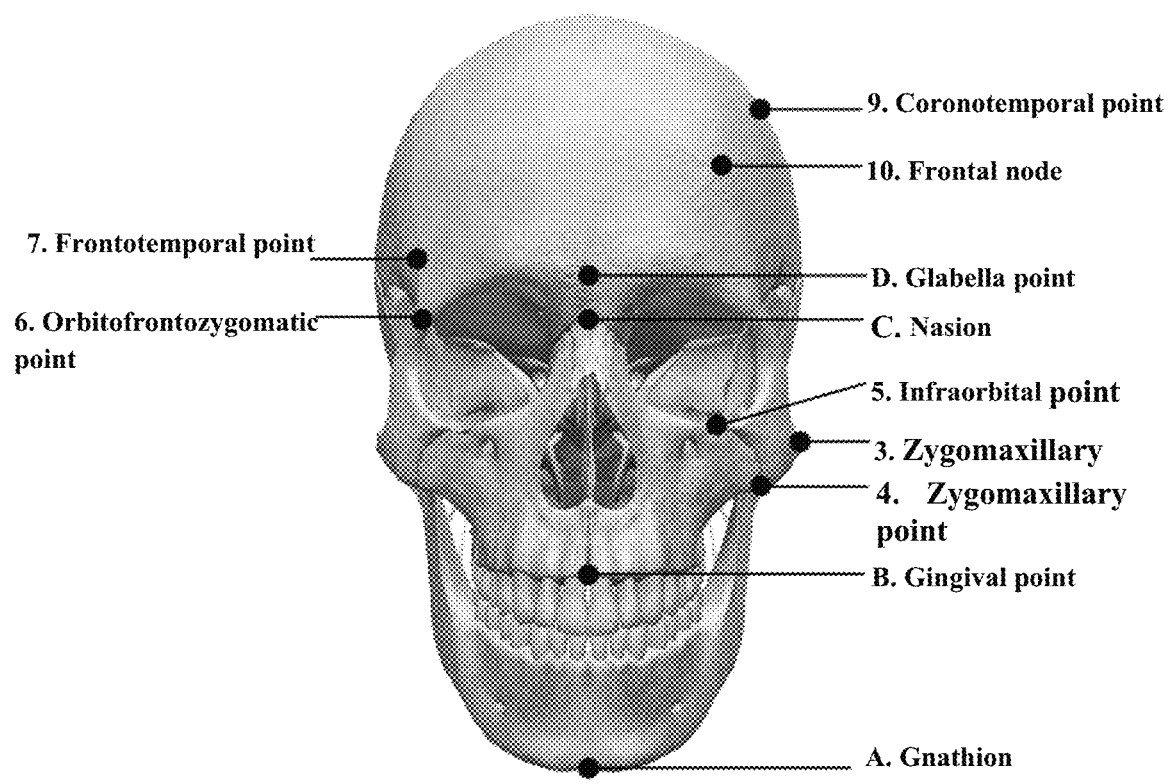
FIG. 8 is a schematic diagram of some key feature points according to an embodiment of the present invention.
Figure 9:
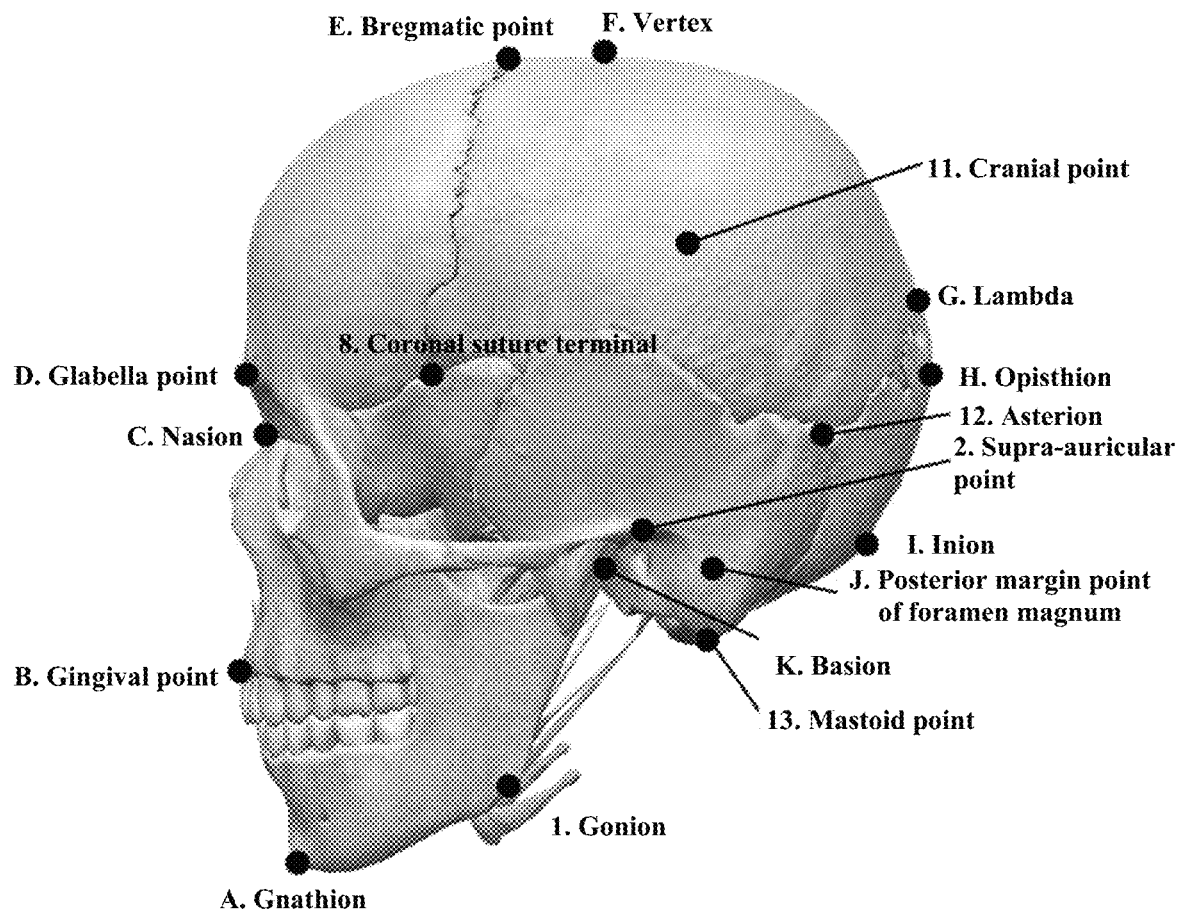
FIG. 9 is a schematic diagram of the other key feature points according to an embodiment of the present invention.

Step 5, according to standard coordinates of key feature points under the skull coordinate system, a contour line of the skull is adjusted to obtain the final original skull model. The key feature points include a submental point, a gingival point, a glabella point, etc. The key feature points selected in this embodiment are as shown in FIG. 8 and FIG. 9. Optionally, the key feature points in the model are first selected by human-computer interaction, and coordinates of the key feature points are adjusted to the obtained standard coordinates to obtain the final original skull model. For example, the standard coordinates of the submental point are (2.54, 0, −121.92), and the standard coordinates of the gingival point are (5.08, 0, −64.77). The standard coordinates of each key feature point are obtained by a lot of application practices, and are considered as they can better reflect the contour shape of skull model.

Figure 10:
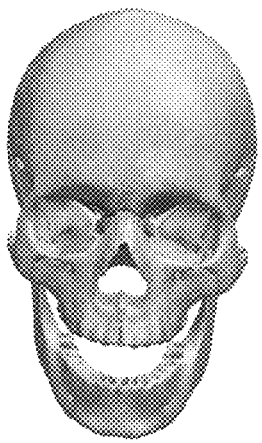
FIG. 10 is a schematic diagram of a front view of a skull model after parts that have little influence on crash test indexes are removed according to an embodiment of the present invention.
Figure 11:
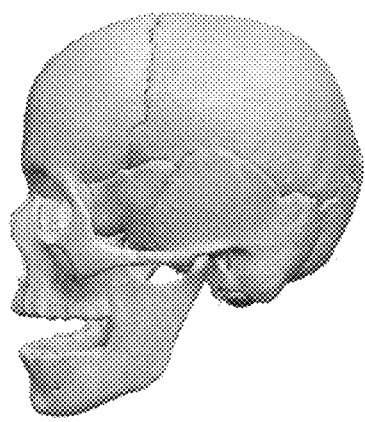
FIG. 11 is a schematic diagram of a side view of a skull model after parts that have little influence on crash test indexes are removed according to an embodiment of the present invention.

Based on the foregoing embodiments and the following embodiments, this embodiment refines a process of extracting a hole boundary contour line. Optionally, the extracting a hole boundary contour line from the original skull model includes the following steps:

S0, parts that have little influence on crash test indexes are removed from the original skull model through human-computer interaction. For example, stylohyoid ligaments connected to temporal bones are removed; hyoid bones are removed; stylomandibular ligaments, lateral ligaments, joint capsules, and sphenomandibular ligaments, which are connected to the mandible, are removed; and all teeth, an inferior turbinate, an ethmoid perpendicular plate, and vomers are removed, thus obtaining the skull model shown in FIG. 10 and FIG. 11. It can be seen more intuitively from FIG. 10 and FIG. 11 that holes to be repaired mainly include. left and right eye holes, nose holes, a mouth hole, left and right ear holes, left and right jaw holes, occipital holes, and the like.

S1, after the foregoing parts are removed, each hole boundary point of the original skull model is extracted. Optionally, the original skull model is composed of a large number of triangular nets. Except boundary triangular nets of holes, edges of each of other triangular nets are common edges of two triangular nets, but the boundary triangular nets of the holes each have one edge that only belongs to one triangular net. According to this characteristic, a plurality of adjacent nodes of any node in the original skull model are first determined; and if edges constructed by the plurality of adjacent nodes form a closed curve, the node is determined as a non-hole boundary point; otherwise, the node is determined as a hole boundary point.

Figure 12:
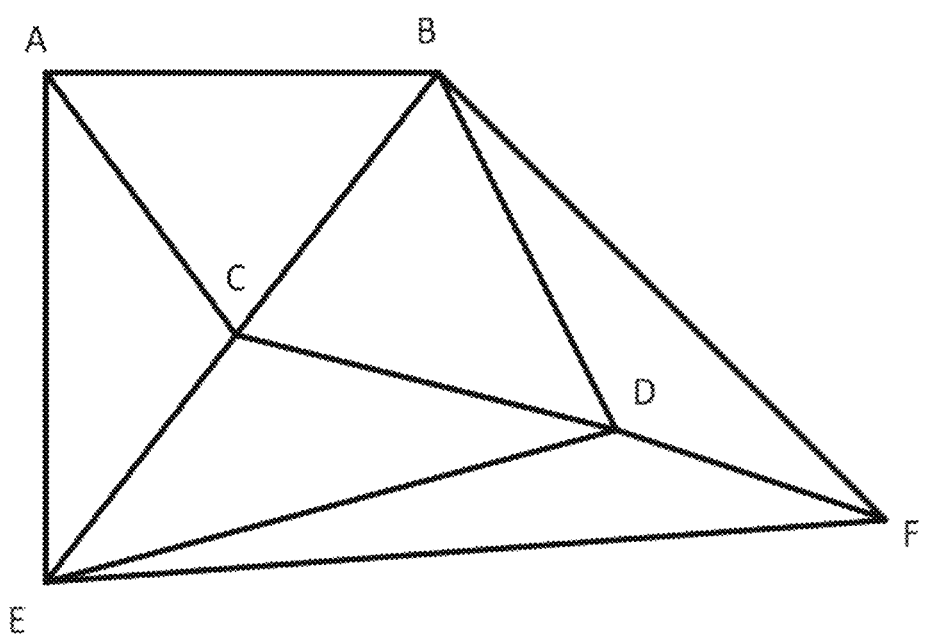
FIG. 12 is a schematic diagram of extracting hole boundary points according to an embodiment of the present invention.

With FIG. 12 as an example, adjacent nodes include point C include A, B, D, and E; and triangular edges AB, BD, DE, and EA constructed by these adjacent nodes form a closed curve, so point C is a non-hole boundary point; and adjacent nodes of point F include B, D, and E, and triangular edges BD and DE constructed by these adjacent nodes cannot form a closed curve, so point F is a hole boundary point.

S2, any hole boundary point is added into a hole boundary point list as a target boundary point. The hole boundary point list is used for storing a sequence of boundary points of a hole, and the boundary points are sequentially connected to obtain a boundary contour line of the hole. Specifically, in order to repair holes, a complete boundary contour of each hole has to be found, that is, all boundary points that construct a hole area need to be found. The boundary of a hole is a continuous and closed point set. In this embodiment, a hole boundary list is configured for each hole to store complete boundary contour information. Moreover, the skull model has two kinds of boundaries. a model boundary and a hole boundary. In this embodiment, the hole boundary needs to be repaired, and the model boundary does not need to be repaired. The inner part of the hole boundary is a net-free part, and the outer part of the model boundary is a net-free part. In order to avoid mistaking the model boundary as the hole boundary for repairing, the model boundary may be eliminated manually before selecting any hole boundary point.

S3, a rightmost triangular net is selected from unselected adjacent triangular nets of the target boundary point, as a target triangular net. It should be noted that the right side here is a right side of a two-dimensional graph formed by projecting the skull model onto a two-dimensional plane, which is not necessarily related to the right side of "the front orientation of the skull model" in the foregoing embodiment, and the two may be the same or different.

S4, an unselected rightmost node in the target triangular net is selected as a target node.

S5, if the target node is a hole boundary point, the target node is added to the hole boundary point list as a new target boundary point, and S3 is returned to.

S6, if the target node is a non-hole boundary point, S4 is returned to.

S7, when a latest target boundary point coincides with any hole boundary point, an iterative loop in S5 or S6 is terminated, where a hole boundary contour line is constructed by the boundary point sequence in the hole boundary point list.

More specifically, taking FIG. 12 as an example, if the target boundary point is point A, it is only necessary to determine whether the rightmost node B in the rightmost adjacent triangle ΔABC of point A is a hole boundary point. From the extraction process of a hole boundary point, node B is a hole boundary point, then search is continued with node B as a new target boundary point, and so on until a starting boundary point is traversed again. Optionally, the rightmost adjacent triangular net and the rightmost node may be obtained by human-computer interaction, or may be determined from coordinates of each node. When the right side of the graph is the same as the right side of "the front orientation of the skull model", the node with smaller y-axis coordinates in the skull coordinate system is on the righter side.

This embodiment optimizes search efficiency of a hole boundary point by using the topological relation of nets. In each S3-S7 cycle, the target boundary point is regarded as a starting point to start searching, and only a node that has not been accessed in the adjacent triangle on the rightmost side of the starting point is determined, thereby avoiding traversing all nodes and improving computation efficiency. Similarly, in each S4-S7 cycle, a similar strategy is also employed to avoid repeated traversal and further improve the computation efficiency.

Based on the foregoing embodiments and the following embodiments, this embodiment refines a process of net shape adjustment. The triangular net adjustment in this embodiment is based on the minimum internal angle maximization method or the minimum weight method, and therefore the two methods are introduced first.

Figure 13:
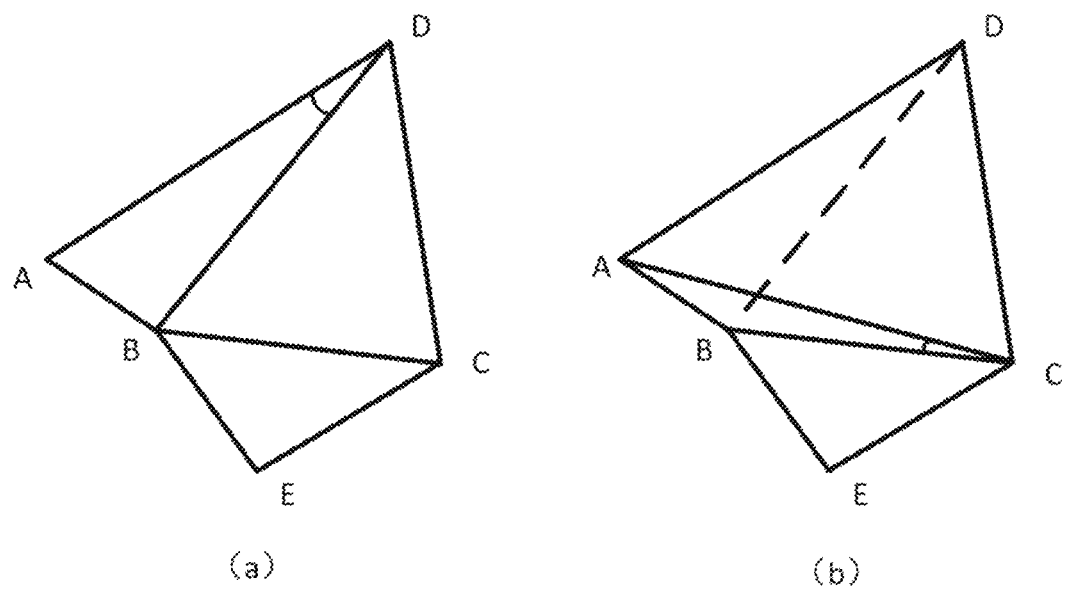
FIG. 13 is a schematic diagram of a minimum internal angle maximization method according to an embodiment of the present invention, where

As shown in FIG. 13, adjacent triangular nets ABD and BCD form a quadrilateral ABCD, and a triangulation form of the quadrilateral ABCD is adjusted by the minimum internal angle maximization method. Specifically, minimum internal angles of the adjacent triangular nets ABD and BCD are compared, to find a triangulation form that maximizes the minimum internal angles. As shown in FIG. 13, the minimum internal angle in FIG. 13(a) is ∠ADB, and the minimum internal angle in FIG. 13(b) is ∠ACB. Because ∠ADB >∠ACB, FIG. 13(a) is selected as a preferred triangulation form. If initial triangular nets are consistent with FIG. 13(a), the node connection relationship of the triangular nets remains unchanged. If the initial triangular nets are consistent with FIG. 13(b), a diagonal AC is deleted, and a diagonal BD is connected.

Figure 14:
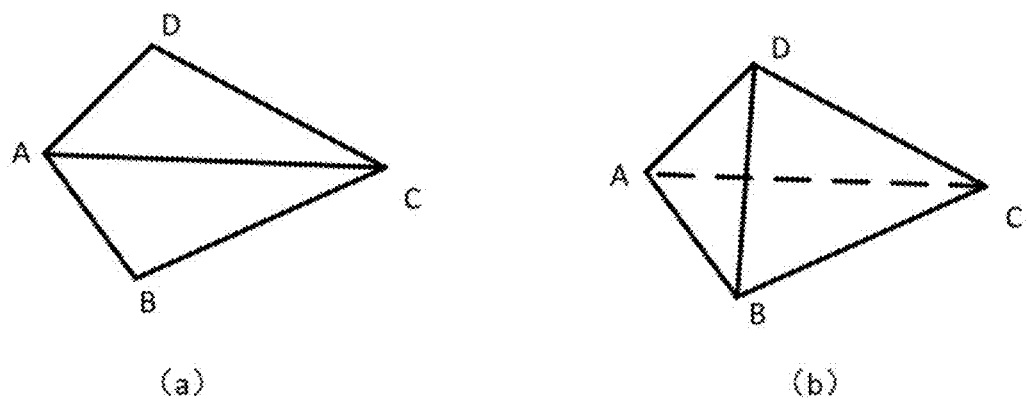
FIG. 14 is a schematic diagram of a minimum weight method according to an embodiment of the present invention, where

As shown in FIG. 14, adjacent triangular nets ABD and BCD form a quadrilateral ABCD. Lengths of two diagonals of the quadrilateral ABCD are compared to find a triangulation form that causes the diagonals to be shortest. In FIG. 14, because of BD <AC, FIG. 14(b) is selected as the triangulation form. If initial triangular nets are consistent with FIG. 14(b), the node connection relationship of the triangular nets remains unchanged. If the initial triangular nets are consistent with FIG. 14(a), the diagonal AC is deleted, and the diagonal BD is connected.

After each layer of triangular nets is formed in the hole area based on the foregoing two methods, shapes of the triangular nets of this layer are adjusted, instead of uniformly adjusting nets after all layers of triangular nets are generated. When new triangular nets are optimized and adjusted, topological relationships of nodes are used many times, and the topological relationship of nodes of the innermost layer is the simplest, so when the shapes of the triangular nets are adjusted, the nodes of the innermost layer are preferred to select adjacent triangular nets. After new nodes of the $(i+1)^{th}$ layer are generated on the basis of the $i^{th}$ layer, the topological relationship of nodes of the $(i+1)^{th}$ layer are always used for optimization. Thus, only the topological relationship of the $i^{th}$ layer needs to be found, and the relationship between the $(i+1)^{th}$ layer and the $(i+2)^{th}$ layer does not need to be determined. This ensures that, after the triangular net adjustment of the current layer is completed, repeated adjustment is not required in subsequent cycles, so the computation efficiency is improved.

In a specific implementation, the step that shapes of the nets are adjusted according to position relationships between adjacent triangular nets includes the steps that whether nodes of two adjacent triangular nets in the current layer are concyclic is determined; and the following optional manners are performed according to the concyclic determination.

In a first optional manner, nodes of two adjacent triangular nets are concyclic. In this case, distances of two diagonals in a quadrilateral formed by the two adjacent triangular nets are first computed, that is, distance $d_2$ between nodes $p_{i,j}$ and $p_{i+1,j+1}$, and distance $d_3$ between nodes $p_{i,j+1}$ and $p_{i+1,j}$ are computed. If $d_3$ is less than $d_2$, it is indicated that a shortest diagonal condition is satisfied, and the connection relationship of the nodes remains unchanged. If $d_3$ is greater than or equal to $d_2$, an edge formed by connecting $p_{i,j+1}$ and $p_{i+1,j}$ is deleted, and the nodes $p_{i,j}$ and $p_{i+1,j+1}$ are connected to generate new triangular nets, and the topological relationship is updated. Taking FIG. 4 as an example, in a quadrilateral $p_{1,3}\ p_{1,4}\ p_{2,4}\ p_{2,3}$, the distance between $p_{1,3}$ and $p_{2,4}$ is $d_2$, the distance between $p_{2,4}$ and $p_{2,3}$ is $d_3$, $d_3$ is less than $d_2$, the shortest diagonal condition is satisfied, and the connection relationship of the nodes remain unchanged.

In a second optional manner, nodes of two adjacent triangular nets are non-concyclic. In this case, a minimum internal angle of two adjacent triangular nets is first found out, and is assumed as ∠1; and then a minimum internal angle ∠2 of two triangular nets generated by connecting nodes $p_{i,j}$ and $p_{i+1,j+1}$ is found out. If ∠1<∠2, it is indicated that the minimum internal angle of two adjacent triangular nets does not satisfy a maximization criterion, an edge formed by connecting $p_{i,j+1}$ and $p_{i+1,j}$ is deleted, and the nodes $p_{i,j}$ and $p_{i+1,j+1}$ are connected to generate new triangular nets, and the topological relationship is updated. Otherwise, the connection relationship of nodes remains unchanged. Taking FIG. 4 as an example, in a quadrilateral $p_{1,1}\ p_{1,2}\ p_{2,2}\ p_{2,1}$, the minimum internal angle when $p_{1,2}$ and $p_{2,1}$ are connected is greater than the minimum internal angle when $p_{1,1}$ and $p_{2,2}$ are connected, so the triangulation status when $p_{1,2}$ and $p_{2,1}$ are connected is maintained.

After a first pair of adjacent triangular nets between the nodes of the $i^{th}$ layer and the $(i+1)^{th}$ layer is adjusted by using the foregoing two optional manners, whether the next pair of adjacent triangular nets is concyclic is determined, so as to carry out the next iterative loop. After each net shape adjustment, new triangular nets are generated, so AList, BList, and topological relationships between nodes and surfaces are updated synchronously. Such operations may be continued until all triangular nets between the nodes of the $i^{th}$ layer and the $(i+1)^{th}$ layer satisfy criteria of the minimum weight method or the minimum internal angle maximization method.

It may be seen that, during the implementation of the whole method, because new nodes and topological relationships between triangular nets are stored by using a data structure of linked lists, so that nodes can be searched and adjusted quickly and orderly, and building efficiency of a model is improved.

Based on the foregoing embodiments and the following embodiments, this embodiment further processes the skull model after the hole repair. Optionally, after the number of nodes of the final target contour line is less than or equal to a preset value, the method further includes: fitting an implicit surface of each node in a hole; and adjusting each node to the implicit surface by using a gradient descent method, to obtain a smooth skull model.

In the foregoing embodiments, nodes are inserted and triangular nets are formed in the holes, but spatial positions of the inserted nodes cannot make the repaired surface have good smoothness, so a surface equation needs to be built to fit and adjust the spatial positions of these newly inserted nodes. This embodiment employs an implicit surface method, in which the hole area is described according to net information on the hole by using an implicit surface expressed by a radial basis function, and then the inserted node is adjusted to the implicit surface, so that the repaired net surface on the hole is more in line with the trend of the original net.

Specifically, an implicit surface equation is first built. Assuming that a set of hole boundary points and nodes inserted in the hole is P ={$p_1,p_2, \ldots, p_n$}, and each node corresponds to a constraint value {$\omega_1, \omega_2, \ldots, \omega_n$}, an implicit surface g(s) of this area may be constructed, so that each node $p_i$ satisfies $g(p_i) = \omega_i$, where the implicit surface is: $g(s) = \sum_{i=1}^{n} \lambda_j \varphi(s-p_j) + Ms + t$.

In the equation, s(x,y,z) is any point on the surface, M=($m_1, m_2, m_3$) is a 3×1vector, $\lambda_j$ is a weight coefficient of a discrete constraint point (namely, $p_j$ in the set P), $\varphi(s-p_j)$ is a radial basis function, t is a constant, and n is the number of nodes in the set P. To eliminate the influence of affine components in the radial basis function, a constraint is used as follows:

$$\sum_{j=1}^{n}\lambda_j = \sum_{j=1}^{n}\lambda_j p_j^x = \sum_{j=1}^{n}\lambda_j p_j^y = \sum_{j=1}^{n}\lambda_j p_j^z = 0$$

In the equation, $p_j^x$ represents coordinates of a constrained point $p_j$ in the x direction.

Optionally, a Gaussian function $$\varphi(r) = e^{-\left(\frac{r}{c}\right)^2} (c=64)$$

is selected as a deformation function, the constraint is substituted into the implicit surface equation, to $\lambda_j$ and affine transform components M and t are solved, and a final implicit surface expression is obtained as follows:

$$g(s) = \sum_{j=1}^{n} \lambda_j e^{\frac{(x-p_j^x)^2 + (y-p_j^y)^2 + (z-p_j^z)^2}{c^2}} + m_1 x + m_2 y + m_3 z + t$$

After the implicit equation for a fitted surface is built, the node filled in the hole is gradually adjusted to the fitted implicit surface by using a gradient descent method. The gradient descent method is essentially an iterative optimization algorithm, that is, to find a direction that enables the inserted node to approach the fitted surface fastest, and this direction is generally a negative gradient direction of the implicit surface equation on the node. After all the inserted nodes are adjusted by using the foregoing method, final inserted nodes and adjusted triangular nets are obtained. The inserted nodes P={$p_1, p_2, \ldots, p_n$} are adjusted to the implicit surface g(s), so that each auxiliary inserted node approximates the implicit surface in its gradient direction. Specifically, a gradient of the surface in the hole area is expressed as:

$$\nabla g = \left(\frac{\partial g}{\partial x}, \frac{\partial g}{\partial y}, \frac{\partial g}{\partial z}\right)$$

The current position of each node is represented by $s_k$, and a mapping node $s_{k+1}$ of $s_k$ on the surface is computed as follows:

$$S_{k+1} = S_k - \frac{g(S_k)}{\|\nabla g(S_k)\|^2} \nabla g(S_k)$$

If $|g(S_{k+1})|$ is less than a limit error $\epsilon$ (for example, $\epsilon=0.001$), it indicates that $s_k$ is on the hole surface, and adjustment of the node is completed. Otherwise, $s_{k+1}$ is regarded as new $s_k$, and the operation of computing $s_{k+1}$ is returned until $|g(S_{k+1})|$ is less than the limit error $\epsilon$. After all the nodes are adjusted, the triangular net nodes in a surrounding area of the hole are located on the same implicit surface as the nodes inserted in the hole area, so that the surface of the hole area is smoothly spliced with a net surface at the edge of the hole.

Figure 15:
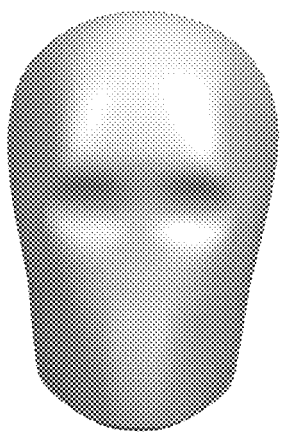
FIG. 15 is a schematic diagram of a front view of a simplified skull model according to an embodiment of the present invention.
Figure 16:
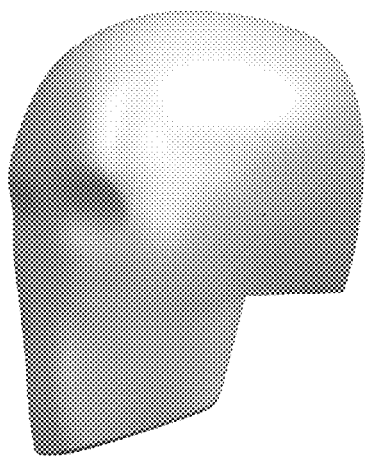
FIG. 16 is a schematic diagram of a side view of a simplified skull model according to an embodiment of the present invention.
Figure 17:
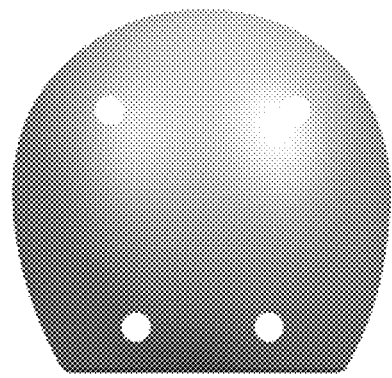
FIG. 17 is a schematic diagram of a rear view of a simplified skull model according to an embodiment of the present invention.

After the smooth skull model is obtained, in order to facilitate the installation and removal of a crash dummy head sensor, the method further includes: forming the smooth skull model into two parts, and giving each surface of the smooth skull model a corresponding thickness. Through statistical analysis, thicknesses of a frontal bone, a parietal bone, and an occipital bone are 7.01 mm, 5.46 mm, and 7.83 mm, respectively; and standard deviations of the thicknesses are respectively 1.56 mm, 1.01 mm, and 2.43 mm. Finally, a simplified skull model is obtained, as shown in FIGS. 15, 16, and 17.

The skull geometric data used for building the skull model in the embodiments of the present invention mainly come from CT scan data and human skull measurement data. First, an original skull model which substantially meets shape and rough contour characteristics of the skull is built according to CT scan data, then a Frankfurt plane is determined according to left and right supra-auricular points and a left infraorbital point, a skull coordinate system is built, the skull model is adjusted according to human skull measurement data, and an outer contour curve of the skull model is adjusted according to positions of key feature points, so that the skull model has universality. Then, holes on the surface of the skull are repaired, that is, depressions are filled, and protrusions are smoothed, to simplify the complex skull model. The whole method can quickly and simply build a simplified skull model of a crash dummy, and avoid excessive description. Repairing protrusions and depressions can reflect main cranial surface information and describe cranial surface features. Meanwhile, computations and operations are simple, expensive devices are not required, a time period is short, engineering costs are low, and a skull model can be obtained quickly. The method provides reference for designing a bionic dummy skull model whose appearance and size conform to the characteristics of Chinese people.

Figure 18:
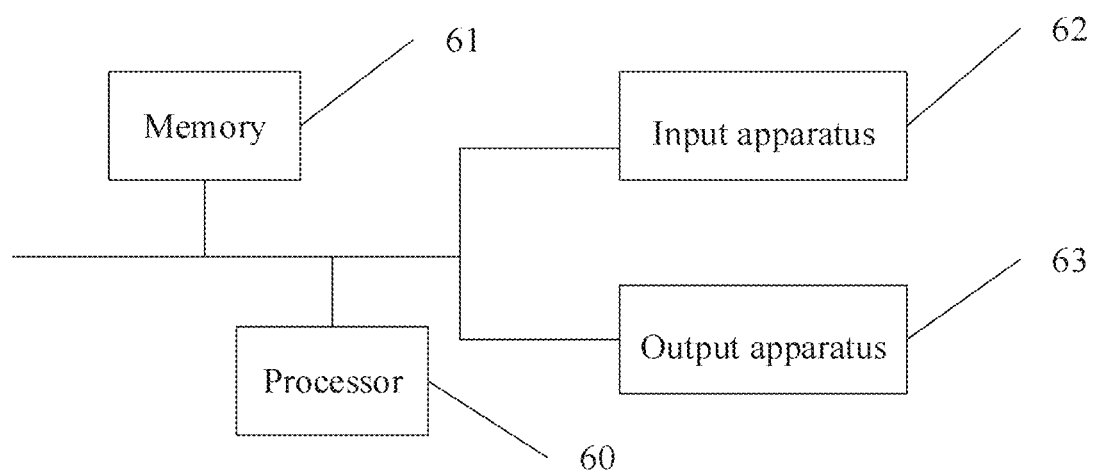
FIG. 18 is a schematic diagram of a structure of an electronic device according to an embodiment of the present invention.

FIG. 18 is a schematic diagram of a structure of an electronic device according to an embodiment of the present invention. As shown in FIG. 18, the device includes a processor 60, a memory 61, an input apparatus 62, and an output apparatus 63. A quantity of the processor 60 in the device may be one or more. One processor 60 is taken as an example in FIG. 18. The processor 60, the memory 61, the input apparatus 62, and the output apparatus 63 in the device may be connected by a bus or in other ways, and they are connected by a bus as an example in FIG. 18.

As a computer-readable storage medium, the memory 61 may be used for storing a software program, a computer-executable program, and modules, such as program instructions/modules corresponding to the method for building a skull model in the embodiments of the present invention. By running the software program, instructions, and modules stored in the memory 61, the processor 60 executes various functional applications of the device and data processing, that is, implements the foregoing method for building a vehicle crash dummy skull model.

The memory 61 may mainly include a program storage area and a data storage area, where the program storage area may store an operating system, and an application program required for at least one function; and the data storage area may store data created according to use of a terminal, and the like. Moreover, the memory 61 may include a high speed random access memory, and may also include a non-volatile memory, such as at least one of a magnetic disk storage device, a flash memory, or other non-volatile solid-state storage devices. In some examples, the memory 61 may further include memories disposed remotely from the processor 60, and the remote memories may be connected to the device through a network. Examples of the network include, but are not limited to, the Internet, an intranet, a local area network, a mobile communications network, or a combination thereof The input apparatus 62 may be used for receiving input digit or character information, and generate key signal input related to user settings and function control of the device.

An embodiment of the present invention further provides a computer-readable storage medium storing a computer program, where the program, when executed by a processor, implements the method for building a skull model according to any of the embodiments.

The computer storage medium in this embodiment of the present invention may employ any combination of one or more computer-readable media. The computer-readable medium may be a computer-readable signal medium or a computer-readable storage medium. For example, the computer-readable storage medium may be, but is not limited to, an electrical, magnetic, optical, electromagnetic, infrared, or semiconductor system, apparatus, or device, or any combination of the above. More specific examples (a non-exhaustive list) of the computer-readable storage medium include an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination of the above. Herein, the computer-readable storage medium may be any tangible medium containing or storing a program that may be used by an instruction execution system, apparatus, or device, or a combination thereof.

The computer-readable signal medium may include a data signal that is propagated in a baseband or as part of a carrier wave, in which computer-readable program code is carried. The propagated data signal may be in a plurality of forms, and includes, but is not limited to, an electromagnetic signal, an optical signal, or any suitable combination thereof. The computer-readable signal medium may also be any other computer-readable medium except the computer-readable storage medium. The computer-readable medium is capable of sending, propagating, or transmitting a program used by an instruction execution system, apparatus, or device, or a combination thereof The program code included in the computer-readable medium may be transmitted by any appropriate medium, including but not limited to wireless, wired, an optical cable, RF, or the like, or any appropriate combination thereof.

The computer program code for executing operations in the present invention may be compiled in one or more programming languages or a combination thereof. The programming languages include object-oriented programming languages, such as Java, Smalltalk, and C++, and further include conventional procedural programming languages, such as "C" language or similar programming languages. The program code may be completely or partially executed on a user computer, executed as a separate software package, partially executed on a user computer and partially executed on a remote computer, or completely executed on a remote computer or server. In a case involving a remote computer, the remote computer may be connected to a user computer through any network including a local area network (LAN) or a wide area network (WAN), or may be connected to an external computer (for example, connected through the Internet by using an Internet service provider).

Finally, it should be noted that the foregoing embodiments are merely used for explaining, but not limiting, the technical solutions of the present invention; although the present invention is described in detail with reference to the foregoing embodiments, those of ordinary skill in the art should understand that the technical solutions described in the foregoing embodiments may be modified, or some or all of the technical features may be equivalently substituted; and such modifications or substitutions do not make the essence of the corresponding technical solutions depart from the technical solutions of the present invention.

What is claimed is:

1. A method for building a vehicle crash dummy skull model, comprising:

building an original skull model according to computed tomography scan data of a human skull, and extracting a hole boundary contour line from the original skull model;

inserting, according to a distance between adjacent first nodes on the hole boundary contour line, a new first node between adjacent first nodes, to obtain a target contour line; specifically, traversing first nodes on the hole boundary contour line, and computing an average distance between adjacent first nodes; computing a ratio of a distance of each pair of adjacent first nodes to the average distance; inserting, if the ratio corresponding to adjacent first nodes is greater than a first preset value, a new first node between adjacent first nodes, and constructing the target contour line by the first nodes on the hole boundary contour line and the new first nodes together; and alternatively, constructing, if the ratio corresponding to each pair of adjacent first nodes is less than or equal to the first preset value, the target contour line by the first nodes on the hole boundary contour line;

inserting a plurality of second nodes into holes according to the target contour line, and inserting a new second node between adjacent second nodes according to a distance between adjacent second nodes, to obtain an intermediate boundary contour line; specifically, traversing each first node on the target contour line, to determine a midpoint and a vertical direction of a line connecting adjacent first nodes; starting from each midpoint, and extending a set distance to an interior of a hole in the corresponding vertical direction, to obtain each second node, wherein the set distance is an average distance between the adjacent first nodes on the target contour line; traversing the plurality of second nodes, and computing an average distance between adjacent second nodes; computing a ratio of a distance of each pair of adjacent second nodes to the average distance; inserting, if the ratio corresponding to adjacent second nodes is greater than a second preset value, a new second node between adjacent second nodes, and constructing the intermediate boundary contour line by the plurality of second nodes and the new second nodes together; and alternatively, constructing, if the ratio corresponding to each pair of adjacent second nodes is less than or equal to the second preset value, the intermediate boundary contour line by the plurality of second nodes;

forming triangular nets according to the nodes on the target contour line and the intermediate boundary contour line, and adjusting shapes of the nets according to position relationships between adjacent triangular nets; and with the intermediate boundary contour line as a new target contour line, returning to the operation of inserting a plurality of second nodes until the number of nodes of a final target contour line is less than or equal to a third preset value.

2. The method according to claim 1, wherein the original skull model comprises a plurality of triangular nets; and the extracting a hole boundary contour line from the original skull model comprises:

S1, extracting each hole boundary point of the original skull model;

S2, adding any hole boundary point into a hole boundary point list as a target boundary point;

S3, selecting, from unselected adjacent triangular nets of the target boundary point, a rightmost triangular net as a target triangular net;

S4, selecting an unselected rightmost node in the target triangular net as a target node;

S5, adding, if the target node is a hole boundary point, the target node into the hole boundary point list as a new target boundary point, and returning to S3;

S6, returning to S4 if the target node is a non-hole boundary point; and

S7, terminating, when a latest target boundary point coincides with any hole boundary point, an iterative loop in S5 or S6, and constructing a hole boundary contour line by a sequence of boundary points in the hole boundary point list.

3. The method according to claim 2, wherein the extracting each hole boundary point of the original skull model comprises:

determining a plurality of adjacent nodes of any node in the original skull model; and determining, if lines connected between the plurality of adjacent nodes form a closed curve, the node as a non-hole boundary point; and otherwise, determining the node as a hole boundary point.

4. The method according to claim 1, wherein the forming triangular nets according to the nodes on the target contour line and the intermediate boundary contour line comprises:

determining, for any one of the plurality of second nodes, adjacent nodes, between which the second node is to be inserted, on the target contour line, and connecting the adjacent nodes with the second node separately;

determining, for any new second node other than the plurality of second nodes, adjacent second nodes, between which the new second node is to be inserted, among the plurality of second nodes, and four nodes, between which adjacent second nodes are to be inserted, on the target contour line, and connecting the new second node with repeated nodes of the four nodes; and constructing the triangular nets by the connected edges, the target contour line, and the intermediate boundary contour line.

5. The method according to claim 1, wherein the adjusting shapes of the nets according to position relationships between adjacent triangular nets comprises:

adjusting, if the nodes of the adjacent triangular nets are concyclic, the node connection relationship between the adjacent triangular nets through a minimum weight method; and alternatively;

adjusting, if the nodes of the adjacent triangular nets are non-concyclic, the node connection relationship between the adjacent triangular nets through a minimum internal angle maximization method.

6. The method according to claim 1, wherein after the number of nodes of the final target contour line is less than or equal to the third preset value, the method further comprises:

fitting an implicit surface of each node in a hole; and adjusting each node to the implicit surface through a gradient descent method, to obtain a smooth skull model.

7. An electronic device, comprising:

one or more processors; and a memory, used for storing one or more programs; wherein when the one or more programs are executed by the one or more processors, the one or more processors are enabled to implement the method for building a vehicle crash dummy skull model according to claim 1.

8. A non-transitory computer-readable storage medium, storing a computer program, wherein the program, when executed by a processor, implements the method for building a vehicle crash dummy skull model according to claim 1.

* * * * *